F. A. STOHLMANN.
THERMOMETER.
No. 191,897. Patented June 12, 1877.
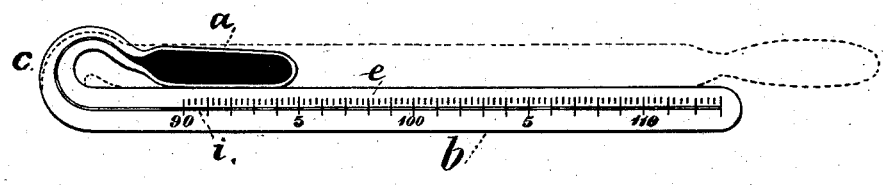
Witnesses
Chas H Smith
Harold Serrell
Inventor
Frederick A. Stohlmann.
per Lemuel W. Serrell
Atty

UNITED STATES PATENT OFFICE.

FREDERICK A. STOHLMANN, OF BROOKLYN, NEW YORK.

IMPROVEMENT IN THERMOMETERS.

Specification forming part of Letters Patent No. 191,897, dated June 12, 1877; application filed April 25, 1877.

*To all whom it may concern:*

Be it known that I, FREDERICK A. STOHLMANN, of Brooklyn, in the county of Kings and State of New York, have invented an Improvement in Surgical Thermometers, of which the following is a specification:

Thermometers to test the heat of the body are usually made with a straight glass tube, with a bulb at one end, and with the degrees marked upon the tube, and as the range of test in the animal heat is only a few degrees the thermometers are made short, and the mercury in the normal state contracts out of the tube into the bulb. It is also usual to have a register within the tube, and this is generally mercurial, the small quantity of air in the tube serving to prevent the union of the two columns.

After the instrument has been used it is necessary to shake the registering portion of the index toward the bulb again, and in practice it is found that the same is often lost and the thermometer rendered useless by the register passing into the bulb and becoming merged with the mercury. Besides this, the ordinary thermometers are liable to roll when laid upon a table.

My invention is made to obviate these difficulties; and consists in a thermometer having a return-bend made in the glass tube between the register and the bulb.

In the drawing I have shown said thermometer by a plan view.

The bulb $a$ is of suitable size and shape, and $b$ is the tube thereof, in which is a return bend at $c$ between the bulb and the index portion $e$. The register at $i$ is within the tube.

The bulb may be in the position shown in dotted lines. In either case there is a bend between the bulb and the register.

In consequence of this construction the thermometer is not liable to roll, and the register cannot become united with the main column of the mercury, because when the register is shaken toward the bulb it cannot pass around the return bend, but will be shaken toward that bend, and the direction in which the register is shaken cannot make said register pass that bend; furthermore, the thermometer occupies much less space than those heretofore made, and the temperature is more uniform throughout the thermometer, because the entire instrument is brought into contact with the body, being placed in the mouth or beneath the arm.

I claim as my invention—

The theremometer, having a return-bend between the bulb and the index, and having a register in the index portion of the tube, substantially as set forth.

Signed by me this 23d day of April, A. D. 1877.

FREDK. A. STOHLMANN.

Witnesses:
GEO. T. PINCKNEY,
CHAS. H. SMITH.